US008014451B2

(12) United States Patent
Suh

(10) Patent No.: US 8,014,451 B2
(45) Date of Patent: Sep. 6, 2011

(54) VIDEO ENCODER/DECODER WITH MACROBLOCK ARRANGEMENT OF SIGNIFICANT ITEM

(75) Inventor: Doug-young Suh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1132 days.

(21) Appl. No.: 11/073,898

(22) Filed: Mar. 8, 2005

(65) Prior Publication Data

US 2005/0196057 A1 Sep. 8, 2005

Related U.S. Application Data

(60) Provisional application No. 60/550,322, filed on Mar. 8, 2004.

(30) Foreign Application Priority Data

Mar. 13, 2004 (KR) ........................ 10-2004-0017165

(51) Int. Cl.
*H04N 7/12* (2006.01)
(52) U.S. Cl. .................................. 375/240.24
(58) Field of Classification Search .............. 375/240.24
See application file for complete search history.

(56) References Cited

U.S. PATENT DOCUMENTS

| 6,393,060 B1 | 5/2002 | Jeong |
| 6,426,976 B1 | 7/2002 | Wen et al. |
| 6,462,681 B1 | 10/2002 | Van Der Vleuten et al. |
| 6,614,936 B1 | 9/2003 | Wu et al. |
| 6,639,943 B1 | 10/2003 | Badha et al. |
| 6,851,083 B1 * | 2/2005 | Hagenauer et al. ............ 714/774 |
| 2002/0006162 A1 * | 1/2002 | Nakao et al. ............. 375/240.16 |

FOREIGN PATENT DOCUMENTS

EP 1 296 526 A1 3/2003

(Continued)

OTHER PUBLICATIONS

H. M. Radha et al., The MPEG-4 Fine-Grained Scalable Video Coding Method for Multimedia Streaming Over IP, IEEE Transactions on Multimedia, vol. 3, No. 1, Mar. 2001, pp. 53-68.

(Continued)

*Primary Examiner* — Jay Patel
*Assistant Examiner* — Richard Torrente
(74) *Attorney, Agent, or Firm* — Staas & Halsey LLP

(57) ABSTRACT

A video encoder/decoder and a video encoding/decoding method and medium. The video decoder includes a decoding unit which receives a video packet in which more significant items of items included in blocks of macroblocks, which make up the video packet, are arranged in a front part of the video packet and less significant items are arranged in a rear part of the video packet. The decoding unit sequentially decodes the items arranged in the video packet. Accordingly, an FGS encoding function is effectively performed without degrading the bit rate.

23 Claims, 14 Drawing Sheets

FOREIGN PATENT DOCUMENTS

| | | |
|---|---|---|
| JP | 2001-268568 | 9/2001 |
| JP | 2001-268569 | 9/2001 |
| KR | 1999-0060794 | 7/1999 |
| KR | 1999-0066827 | 8/1999 |
| KR | 2001-0007273 | 1/2001 |
| KR | 2001-0031300 | 4/2001 |
| KR | 2001-0078393 | 8/2001 |
| KR | 2001-0089641 | 10/2001 |
| KR | 2002-0064932 | 8/2002 |
| KR | 2003-0020382 | 3/2003 |
| KR | 2003-0081722 | 10/2003 |

OTHER PUBLICATIONS

L. Weiping, "Overview of Fine Granularity Scalability in MPEG-4 Video Standard", Fellow, IEEE Transactions on Circuits and Systems for Video Technology, vol. II, No. 3, Mar. 2001, pp. 301-317.

M. van der Schaar et al., "A Hybrid Temporal-SNR Fine-Granular Scalability for Internet Video", IEEE Transactions on Circuits and Systems for Video Technology, vol. II, No. 3, Mar. 2001, pp. 318-331.

Korean Patent office action mailed Oct. 8, 2010 corresponds to Korean Patent Application No. 10-2004-0017165.

* cited by examiner

VIDEO ENCODER/DECODER WITH MACROBLOCK ARRANGEMENT OF SIGNIFICANT ITEM

CROSS-REFERENCE TO RELATED APPLICATIONS

This application claims the benefit of Korean Patent Application No. 2004-17165, filed on Mar. 13, 2004, in the Korean Intellectual Property Office, and the benefit of U.S. Provisional Patent Application No. 60/550,322, filed on Mar. 8, 2004, in the U.S. Patent and Trademark Office, the disclosures of which are incorporated herein in their entirety by reference.

BACKGROUND OF THE INVENTION

1. Field of the Invention

Embodiments of the present invention relate to Fine Granularity Scalability (FGS) video coding/encoding, and more particularly, to a video encoder/decoder and a video encoding/decoding method and medium, and a video packet structure.

2. Description of the Related Art

Scalable coding methods are in great demand to perform general coding operations for still or moving pictures.

With the advent of mobile communications services and wireless Internet, everybody can make communications using picture information at any time in any place. People also typically desire to obtain remote picture information using information appliances connected to various types of computers, such as, laptop computers, personal digital assistants (PDAs), and the like. In addition, in the future, various types of information appliances will appear. However, the future Internet appliances will naturally provide different decoding capabilities or transmission environments because their terminals will naturally have different characteristics or adaptation environments.

To solve this problem, MPEG-4 (Moving Picture Experts Group-4) standards provide techniques for providing pictures of various qualities depending on the circumstances or performances of terminals which receive the resultant encoded pictures. For example, if a receiver terminal has excellent performance and a good transmission line, the terminal may be able to receive and display a high-quality moving picture. On the other hand, if the receiver terminal has poor performance and a bad communications line, the terminal will not be able to receive a high-quality picture. To cover these two cases, a video codec, such as MPEG-2, MPEG-4, H.263, or the like, is designed to perform scalable coding.

Scalable picture coding denotes production of a scalable bitstream by an encoder so that a receiver can receive pictures of various qualities from the encoder. In other words, if a transmitting bitstream is scalable, various types of receivers can be used. For example, low performance receivers can receive and display an average-quality picture bitstream encoded in a basic layer. High performance receivers can receive and display a basic layer picture bitstream and a high-quality picture bitstream encoded in an enhancement layer.

Scalable coding methods are roughly classified into a spatial scalable coding method or a temporal scalable coding method. The spatial scalable coding method is used to improve the spatial resolution of a picture, step by step. The temporal scalable coding method is used to gradually increase the number of pictures displayed on a time axis per unit time. To perform each of the spatial and temporal scalable coding methods, an MPEG-4 encoder uses at least one enhancement layer to transmit a bitstream to a receiver. When a moving picture is encoded using an enhancement layer, a basic layer basically codes a picture with a spatially- and temporally-low resolution and transmits the low quality encoded information to a receiver. The enhancement layer can be coded and transmit information to obtain the picture with an greater resolution.

In scalable coding methods, a picture is coded using two or three layers, so only two or three bit rates can be obtained. However, since some transmission lines, such as the wired/wireless Internet, are not stable, their bandwidth varies arbitrarily. Thus, MPEG-4 is standardizing a fine granularity scalability (FGS) coding method so that an encoder can flexibly adapt to a change in the bit rate provided by a transmission line.

In the FSG coding method, to achieve efficient picture restoration even when a receiver receives only a part of a video bitstream from a transmitter, a video bitstream with its quality being enhanced by an enhancement layer is transmitted bit plane by bit plane. In other words, the current FGS coding method is similar to existing scalable coding methods in that when a transmitter transmits an enhancement layer bitstream to a receiver, the only difference between the original picture and a picture transmitted by a basic layer is the quality of the transmitted picture. However, in the FGS coding method, picture information to be transmitted from the enhancement layer is divided into bit planes, and the most significant bit (MSB) of each bit plane is preferentially sequentially transmitted to the receiver followed by the next MSB. Accordingly, even when the receiver cannot receive all bits necessary for picture restoration due to a change in the bandwidth of a transmission line, it can restore the transmitted picture to some degree, even using only the received bits. However, the MPEG-4 FGS coding method excessively increases the total number of bits due to bit-plane coding.

MPEG-21 SVC (scalable video encoding) is also under standardization as an FGS coding method. MPEG-21 DIA (Digital Item Adaptation) is also under standardization as an FGS coding method, based on the premise that a proxy node located in the middle of a network can arbitrarily change a bit rate.

Current FGS coding methods as described above provide a remarkably low peak signal-to-noise ratio (PSNR) compared to existing single-layer encoding methods, which provides the same bit rate as that provided by the FGS coding method. Also, the current FGS coding methods require existing coding methods to be changed to achieve FGS.

Hereinafter, some conventional data-partitioning methods will be described.

First, ISO/IEC 13818-2 (7.10) deals with data partitioning, in which block data is divided into two parts based on priority breakpoints, the number of which is 67. When a block data is divided into two parts, as specified in MPEG-2, two-layers of encoding are possible, but FGS is not possible.

Second, ISO/IEC 4496-2:2003(E) (E.1.2) deals with data partitioning, which is used as an error-resistant instrument. In data partitioning based on the MPEG-4 motion marker, motion vectors and headers of all of the macroblocks existing in video data are arranged in a front part of a video packet, and motion markers for resynchronization are then arranged and followed by texture information (i.e., DCT coefficients) about all of the macroblocks. This data partitioning is conceptually smaller than the MPEG-2 Part 2 data partitioning and also cannot achieve FGS.

Third, ITU-T Rec. H.264|ISO/IEC 144496-10 AVC (7.3.2.9 and 7.4.2.9) discuss syntax and semantics of slice data partitioning RBSP. A joint video technique (JVT), in which data is divided into 3 categories, similarly cannot achieve FGS.

Thus, these data-partitioning methods cannot be used for the purpose of achieving FGS. Further, current standardized FGS coding methods need a large amount of overhead to achieve FGS, thereby providing a PSNR significantly lower than that of an existing single-layer encoding method which provides the same bit rate as the current FGS coding methods.

FIG. 1 illustrates a conventional single-layer encoding/decoding sequence, in which items included in a video packet are encoded. Referring to FIG. 1, the video packet includes first through N-th macroblocks. Each of the macroblocks includes a macroblock header (MBH) and six blocks. Each of the blocks is made up of items and an end-of-block (EOB) item which is disposed at the end of the items.

According to the conventional single-layer encoding/decoding method of FIG. 1, a first block of the first macroblock is encoded, followed by a second block, etc. After encoding of the first macroblock is completed in the above manner, the second macroblock is encoded. In other words, after all of the items of the first block of the first macroblock, that is, after all first items and an item EOB, are encoded, items of the second macroblock are encoded. If encoding is performed in the above manner, the first and N-th macroblock are disposed at the head and rear of the video packet, respectively, and corresponding items for each block are evenly distributed within the video packet.

However, items in a front part of each block include more significant information, and items in a rear part of each block include less significant information. Also, an item EOB at the end of each block stores EOB, which simply indicates the end of a block.

Nevertheless, since block items are somewhat evenly distributed over a video packet in the conventional encoding method of FIG. 1, if a rear part of the video packet is cut off, macroblock information stored in the cut-off part of the video packet is completely lost. Thus, decoding of only the received portion of the video packet may impede proper reproduction of an original signal.

SUMMARY OF THE INVENTION

Embodiments of the present invention provide a video encoder/decoder capable of achieving an FGS function to adapt easily to different network circumstances without reducing a bitrate, a video encoding/decoding method and medium, and a medium including a corresponding video packet structure.

Additional aspects and/or advantages of the invention will be set forth in part in the description which follows and, in part, will be obvious from the description, or may be learned by practice of the invention.

According to an aspect of the present invention, there is provided a video encoder including an encoding unit which performs encoding such that more significant items of items included in blocks of macroblocks, which make up a video packet, are arranged in a front part of the video packet and such that less significant items are arranged in a rear part of the video packet.

The more significant items may be items located at a front part of each of the blocks, and the less significant items are items located at a rear part of each of the blocks.

The encoding unit may further perform encoding such that the headers of all of the macroblocks are located in front of the items arranged in the video packet.

According to another aspect of the present invention, there is provided a video encoder including an encoding unit which performs encoding such that item groups having more significant items among item groups, each of the item group including identically numbered items among the items included in blocks of each of macroblocks that make up a video packet, are arranged in a front part of the video packet, such that item groups having less significant items are arranged in a rear part of the video packet, and such that resynchronization markers for distinguishing each of the item groups are interposed between item groups.

According to another aspect of the present invention, there is provided a video decoder including a decoding unit which receives a video packet in which more significant items among items included in blocks of macroblocks, which make up the video packet, are arranged in a front part and less significant items are arranged in a rear part, and sequentially decodes the items arranged in the video packet.

According to another aspect of the present invention, there is provided a video decoder including: a variable length decoding unit which receives a video packet in which more significant items among items included in blocks of macroblocks, which make up the video packet, are arranged in a front part and less significant items are arranged in a rear part and which sequentially variable-length-decodes the items arranged in the video packet; an inverse quantizer inversely quantizing all decoded blocks received from the variable length decoding unit; an inverse discrete cosine transform (IDCT) unit performing IDCT on all inversely quantized blocks; and a motion compensator compensating for motions of all IDCTed blocks.

If the variable length decoding unit detects information indicating the end of the video packet at a predetermined point in time before all of the items included in the video packet are completely variable-length-decoded, the variable length decoding unit may output all blocks variable-length decoded at the predetermined point in time to the inverse quantizer.

According to another aspect of the present invention, there is provided a video decoder including: a receiver receiving a video packet in which item groups having more significant items among item groups, each of the item group including identically numbered items among the items included in blocks of each of macroblocks that make up a video packet, are arranged in a front part of the video packet, item groups having less significant items are arranged in a rear part of the video packet, and resynchronization markers for distinguishing each of the item groups are interposed between item groups; a resynchronization marker identifier identifying the resynchronization markers arranged in the video packet; and a decoding unit decoding the items included in the video packet with reference to the identified resynchronization markers.

The decoding unit may decode the items on a block-by-block basis with reference to the identified resynchronization markers.

According to another aspect of the present invention, there is provided a video decoder including a variable length decoding unit, an inverse quantizer, an inverse discrete cosine transform (IDCT) unit, and a motion compensator. The variable length decoding unit receives a video packet in which item groups having more significant items among item groups, each of the item group including identically numbered items among the items included in blocks of each of macroblocks that make up a video packet, are arranged in a front part, item groups having less significant items are arranged in a rear part, and resynchronization markers for distinguishing each of the item groups are interposed between item groups. The variable length decoding unit identifies the resynchronization markers arranged in the video packet and variable-length-decodes the items arranged in the video packet with reference to the identified resynchronization markers. The inverse quantizer inversely quantizes on a block-by-block basis all variable-length-decoded items received from the variable length decoding unit. The inverse discrete cosine transform (IDCT) unit performs IDCT on all inversely quantized blocks. The motion compensator compensates for motions of all IDCTed blocks.

If the variable length decoding unit detects information indicating the end of the video packet at a predetermined point in time before all of the items included in the video packet are completely variable-length-decoded, the variable length decoding unit may output all items variable-length decoded at the predetermined point in time to the inverse quantizer.

According to another aspect of the present invention, there is provided a video encoding method including an operation of performing encoding such that more significant items among items included in blocks of macroblocks, which make up a video packet, are arranged in a front part of the video packet and such that less significant items are arranged in a rear part of the video packet.

According to another aspect of the present invention, there is provided a video encoding method including an operation of performing encoding such that item groups having more significant items among item groups, each of the item group including identically numbered items of the items included in blocks of each of macroblocks that make up a video packet, are arranged in a front part of the video packet, such that item groups having less significant items are arranged in a rear part of the video packet, and such that resynchronization markers for distinguishing each of the item groups are interposed between item groups.

According to another aspect of the present invention, there is provided a video decoding method including: receiving a video packet in which more significant items of items included in blocks of macroblocks, which make up the video packet, are arranged in a front part and less significant items are arranged in a rear part; and sequentially decoding the items arranged in the video packet.

According to another aspect of the present invention, there is provided a video decoding method including: receiving a video packet in which more significant items of items included in blocks of macroblocks, which make up the video packet, are arranged in a front part and less significant items are arranged in a rear part and sequentially variable-length-decoding the items arranged in the video packet; inversely quantizing all variable-length-decoded blocks; performing inverse discrete cosine transform (IDCT) on all inversely quantized blocks; and compensating for motions of all IDCTed blocks.

According to another aspect of the present invention, there is provided a video decoding method including: receiving a video packet in which item groups having more significant items among item groups, each of the item group including identically numbered items among the items included in blocks of each of macroblocks that make up a video packet, are arranged in a front part of the video packet, item groups having less significant items are arranged in a rear part of the video packet, and resynchronization markers for distinguishing each of the item groups are interposed between item groups; identifying the resynchronization markers arranged in the video packet; and decoding the items included in the video packet with reference to the identified resynchronization markers.

According to another aspect of the present invention, there is provided a video decoding method including: receiving a video packet in which item groups having more significant items among item groups, each of the item group including identically numbered items among the items included in blocks of each of macroblocks that make up a video packet, are arranged in a front part, item groups having less significant items are arranged in a rear part, and resynchronization markers for distinguishing each of the item groups are interposed between item groups; identifying the resynchronization markers arranged in the video packet and variable-length-decoding the items arranged in the video packet with reference to the identified resynchronization markers; inversely quantizing all variable-length-decoded items on a block-by-block basis; performing inverse discrete cosine transform (IDCT) on all inversely quantized blocks; and compensating for motions of all IDCTed blocks.

According to another aspect of the present invention, there is provided a computer readable recording medium which stores a program for executing a video decoding method, the video decoding method including the operations of: receiving a video packet in which more significant items of items included in blocks of macroblocks, which make up the video packet, are arranged in a front part and less significant items are arranged in a rear part; and sequentially decoding the items arranged in the video packet.

According to another aspect of the present invention, there is provided a medium including computer readable code implementing a video decoding method, the video decoding method including the operations of: receiving a video packet in which item groups having more significant items among item groups, each of the item group including identically numbered items among the items included in blocks of each of macroblocks that make up a video packet, are arranged in a front part of the video packet, item groups having less significant items are arranged in a rear part of the video packet, and resynchronization markers for distinguishing the item groups from one another are interposed between item groups; identifying the resynchronization markers arranged in the video packet; and decoding the items included in the video packet with reference to the identified resynchronization markers.

According to another aspect of the present invention, there is provided a medium including a video packet, with a data structure of the video packet being designed such that more significant items of items included in blocks of macroblocks, which make up a video packet, are arranged in a front part of the video packet and such that less significant items are arranged in a rear part of the video packet.

According to another aspect of the present invention, there is provided a medium including a video packet transmitted via a network, with a data structure of the video packet being designed such that item groups having more significant items among item groups, each of the item group including identically numbered items among the items included in blocks of each of macroblocks that make up a video packet, are arranged in a front part of the video packet, such that item groups having less significant items are arranged in a rear part of the video packet, and such that resynchronization markers for identifying the item groups are interposed between item groups.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
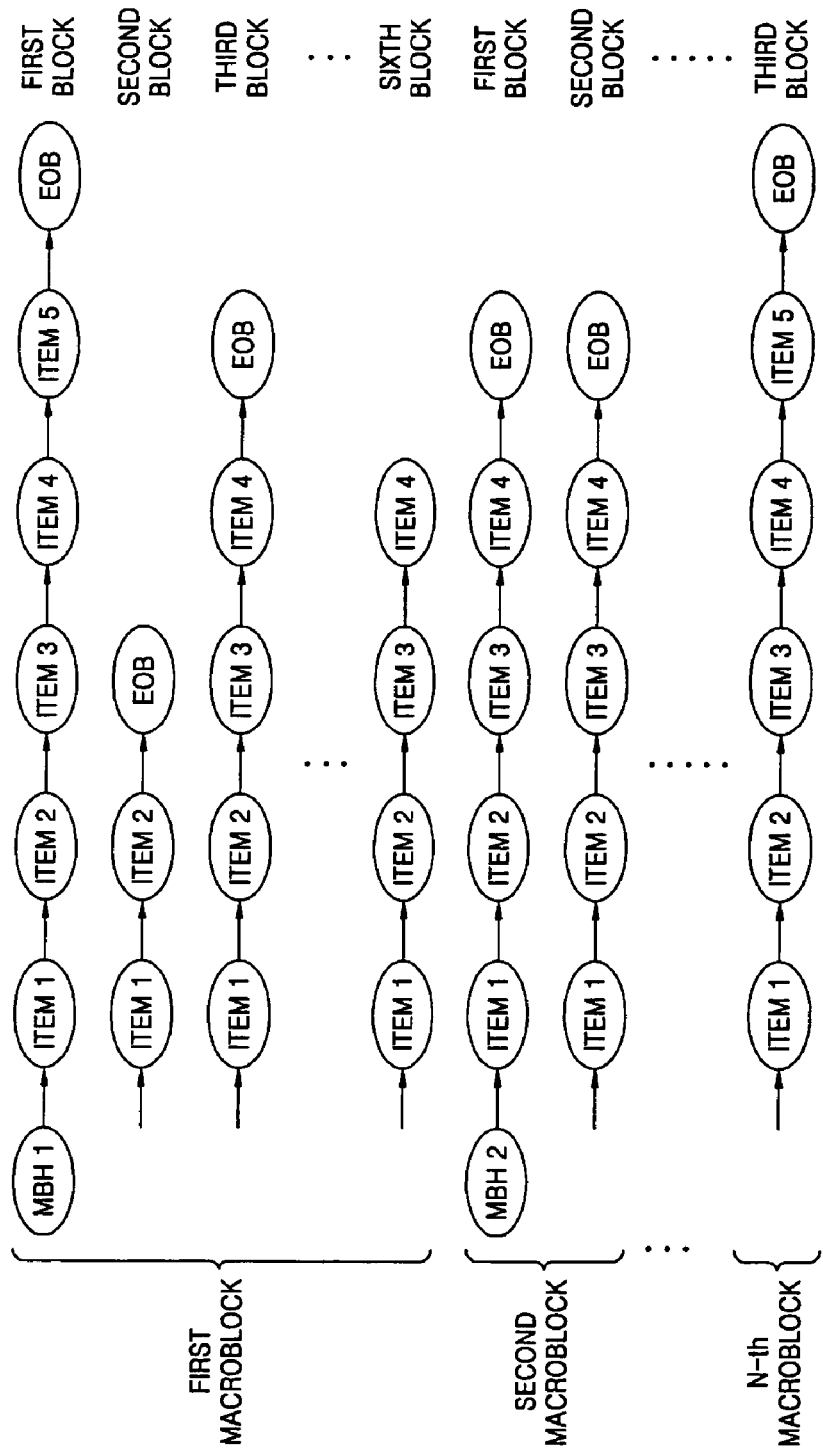
FIG. 1 illustrates a conventional single-layer encoding/decoding method.

Reference will now be made in detail to the embodiments of the present invention, examples of which are illustrated in the accompanying drawings, wherein like reference numerals refer to the like elements throughout. The embodiments are described below to explain the present invention by referring to the figures.

Video data includes a plurality of macroblocks, each of which further includes blocks, and each of the blocks includes a plurality of items. In an ending method, according to an embodiment of the present invention, the video data can be encoded so that items belonging to the front part of each block can be disposed in the front part of the video packet and items belonging to the rear part of each block can be disposed in the rear part of the video packet. Hence, even when the rear part of the video packet is cut off, the video data can still be effectively restored by decoding the received front part of the video packet.

In a decoding method according to an embodiment of the present invention, all of the blocks included in the video packet are variable length decoded (VLDed) at the same time. VLDed data is stored before undergoing inverse quantization and inverse discrete cosine transformation (IDCT). The rear part of the video packet may also be discarded during VLD for the purpose of achieving an FGS function. In this case, the remaining video packet undergoes inverse quantization and its subsequent processes.

In an encoding method according to another embodiment of the present invention, similar to the previous embodiment, video data can be encoded so that groups of more significant items, among groups of items with identical identifying item numbers of the items included in macroblocks, are arranged in the front part of the video packet, with groups of less significant items are arranged in the rear part of the video packet. In contrast with the previous embodiment, resynchronization markers (RMs) are interposed between item groups to distinguish the item groups. In a decoding method according to another embodiment of the present invention, since the starting point of each item group can be recognized from the RMs before VLD, inverse quantization and its subsequent processes can be executed storing VLDed data. Similar to the decoding method according to the previous embodiment, where a rear part of a video packet is discarded during VLD, a picture with as maximum of quality as possible can be restored even by decoding only the remaining video packet.

Figure 2:
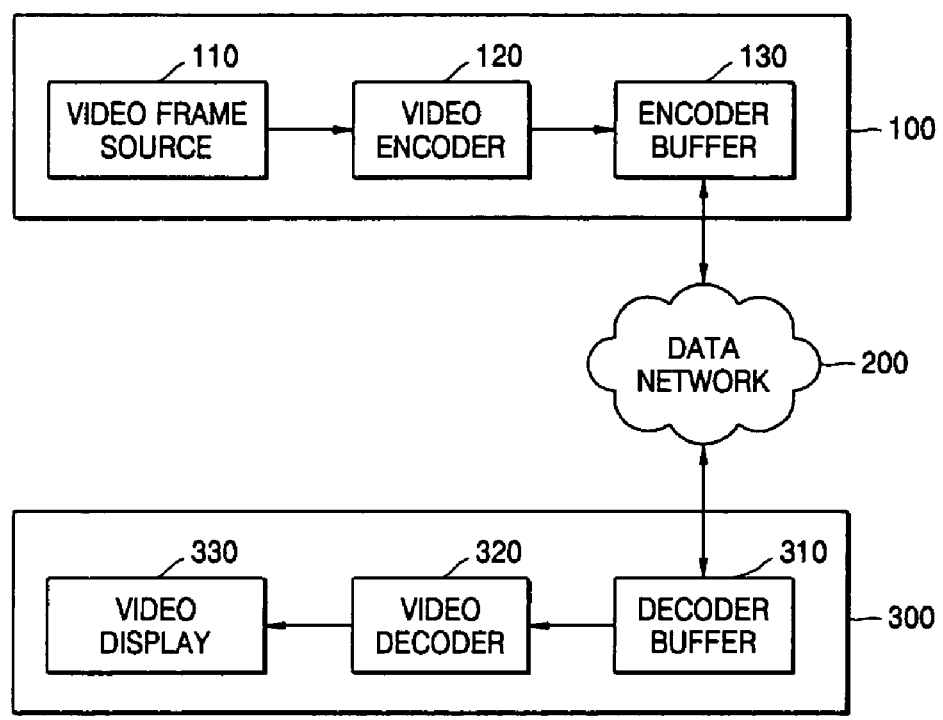
FIG. 2 is a block diagram of a video stream transmission system, according to an embodiment of the present invention, in which a video transmitter transmits a video stream to a video receiver via a data network.

FIG. 2 is a block diagram of a video stream transmission system, according to an embodiment of the present invention, where a video transmitter 100 transmits a video stream to a video receiver 300 via a data network 200.

The video transmitter 100 may be a data network server, a television station transmitter, a cable network, a personal computer (PC), or the like. The video transmitter 100 includes a video frame source 110, a video encoder 120, and an encoder buffer 130.

The video frame source 110 generates a series of unencoded video frames and outputs the same to the video encoder 120. The video encoder 120 encodes the unencoded video frames according to a predetermined coding algorithm and transmits the encoded video frames to the encoder buffer 130. The encoder buffer 130 buffers the encoded video frames before transmitting them to the video receiver 300 via the data network 200. The video transmitter 100 positions important (significant) items for a picture in a front part of a video packet and less important (less significant) items in a rear part of the video packet, encodes the video packet, and transmits the encoded video packet.

The data network 200 may be a public data network, such as, the Internet or the like, of a private data network, such as, a LAN, a WAN, or the like, for example.

Alternatively, an MPEG-21 DIA (Digital Item Adaptation) server may be used as the data network 200. As an example, hen a broadcast service is provided to both a PC connected to a 10 Mbps ADSL and a PDA connected to a 20 kbps wireless Internet, the DIA server can use an FGS coding technique. In other words, when a video packet is stored in an Internet packet, the DIA server existing in the middle of a network can arbitrarily chop off a rear part of the video packet so as to decrease an overall bit rate to a desired level. Even when a rear part of a video packet, encoded using an encoding method according to the present invention, is cut off during transmission, a picture of somewhat high quality can still be ensured, since significant data that primarily affects the picture quality are arranged in a front part of the video packet. To effectively use the FGS coding technique, first, the DIA server must be able to change the total bit rate to a bit rate required by the FGS even without even knowing the underlying MPEG video encoding/decoding. Second, the overhead of the bit rate required by the FDG coding technique must also be small.

Video packet encoding according to the present invention can be performed without requiring much additional data, but rather, by changing the sequence of data encoding. Hence, when the DIV server uses the video packet encoding according to the present invention, it can implement an FGS while satisfying the two aforementioned requirements.

The MPEG-21 DIA standard must specify a correlation between the amount of a video packet to cut off and a degree by which the quality of a picture will degrade. This correlation is referred to as a rate-distortion (R-D) curve and varies depending on the type of a video. Prior to transmission a server can calculate the R-D curve for use in determining how much of the rear part of the video packet to cut off. In other words, the server can obtain the R-D curve using bitstreams of contents, each of which includes data named with a utility function (UF).

The video receiver 300 includes a decoder buffer 310, a video decoder 320, and a video display 330. As only an example, the video receiver 300 may be a television receiver, a desktop PC, and a video cassette player (VCR), or the like depending on the type of an application.

The decoder buffer 310 receives encoded video frames from the data network 200, stores the same, and outputs the same to the video decoder 320 as the video decoder 320 demands. The video decoder 320 ideally decodes the encoded video frames at the same bitrate as the bitrate at which the video encoder 120 performed the encoding. The video display 330 receives decoded video frames from the video decoder 320 and then displays the same.

Figure 3A:
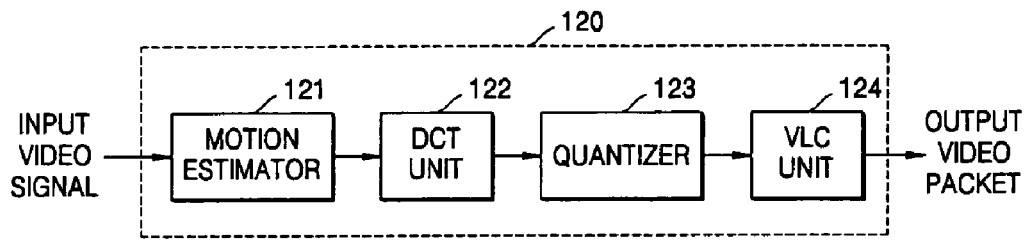
FIG. 3A is a schematic block diagram of a video encoder, according to an embodiment of the present invention.

FIG. 3A is a schematic block diagram of the video encoder 120, which includes a motion predictor 121, a discrete cosine transform (DCT) unit 122, a quantizer 123, a variable length coding (VLC) unit 124.

The motion predictor 121 receives an original video signal corresponding to an original picture, estimates the amount of a motion between a reference frame and a current frame, and transmits estimated motion information to the DCT unit 122. For example, according to the MPEG standard, motion information for each 16 (pixels)×16 (lines) sub-block of a frame may be represented as one, two, three, or four motion vectors.

The DCT unit 122 receives a change of the original picture, based on the estimated motion information obtained by the motion predictor 121, and converts the change from a spatial domain to a frequency domain using a well-known algorithm such as DCT.

The quantizer 123 receives a DCT coefficient from the DCT unit 122 and compresses the same using a well-known quantization technique.

The VLC unit 124 receives quantized DCT coefficients from the quantizer 123 and encodes the same using a VLC technique.

Figure 3B:
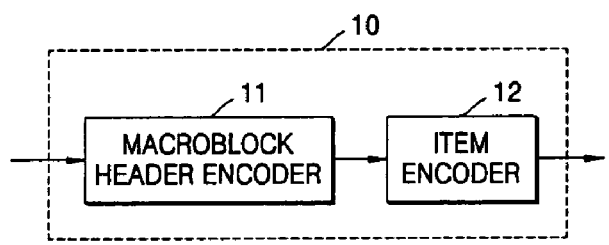
FIG. 3B is a schematic block diagram of a variable length coding unit, according to an embodiment of the present invention.

FIG. 3B is a schematic block diagram of a VLC unit 10 according to an embodiment of the present invention. Referring to FIG. 3B, the VLC unit 10 includes a macroblock header encoder 11 and an item encoder 12.

The macroblock header encoder 11 receives video data corresponding to a single picture frame (which may be a slice within a single picture frame), collects and encodes macroblock headers for all of the macroblocks included in the video data, and arranges the encoded macroblock headers in a front part of a video packet.

The item encoder 12 divides the items included in the blocks of the picture frame into item groups of items with identical identifying item numbers, sequentially encodes the item groups, and arranges the encoded item groups behind the macroblock headers of the video packet. All of the items included in the video data are arranged within the single video packet. The item encoder 12 outputs the video packet.

A video packet encoding method, according to an embodiment of the present invention, will now be described in greater detail with reference to FIGS. 5 through 7B.

Figure 5:
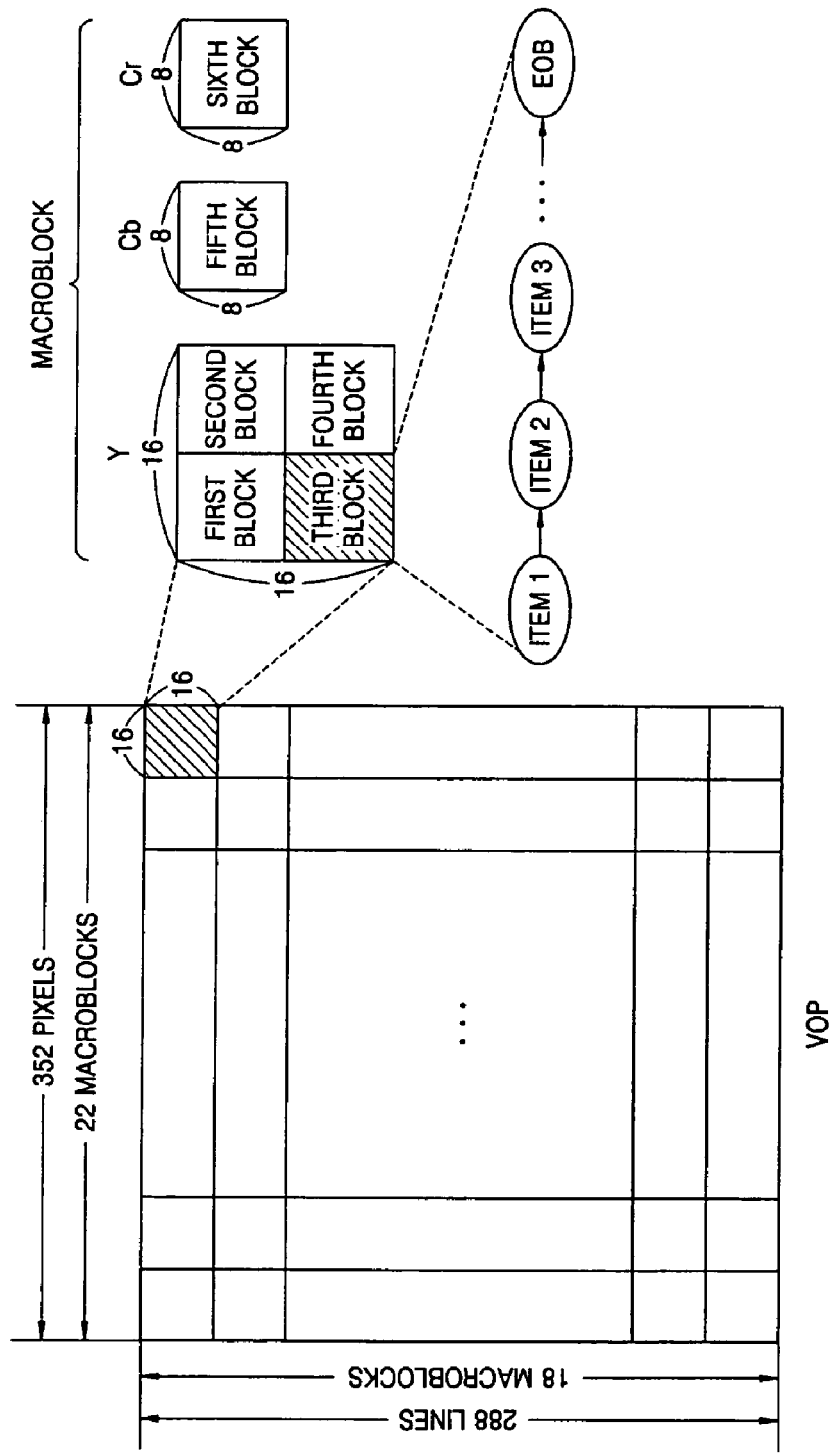
FIG. 5 is a reference diagram illustrating a hierarchical structure of video data.

FIG. 5 is a reference diagram illustrating a hierarchical structure of video data. Referring to FIG. 5, a video object plane (VOP) that represents a video frame is made up of 352 pixels×288 lines. The VOP is divided into 22×18 macroblocks. Each of the macroblocks is made up of 16 pixels×16 lines and includes 6 blocks, as shown in the right side of FIG. 5. The 6 blocks are four luminance signal blocks Y and two chrominance signal blocks Cb and Cr.

Each of the blocks includes transform coefficients and an EOB. Here, the transform coefficients are referred to as "items," and the EOB denotes the end of a block, though embodiments of the present invention are not limited thereto.

A video packet mentioned in the above may be a VOP as shown in FIG. 5. If a VOP can be divided into several slices, a single slice may also be used as a video packet.

Figure 6:
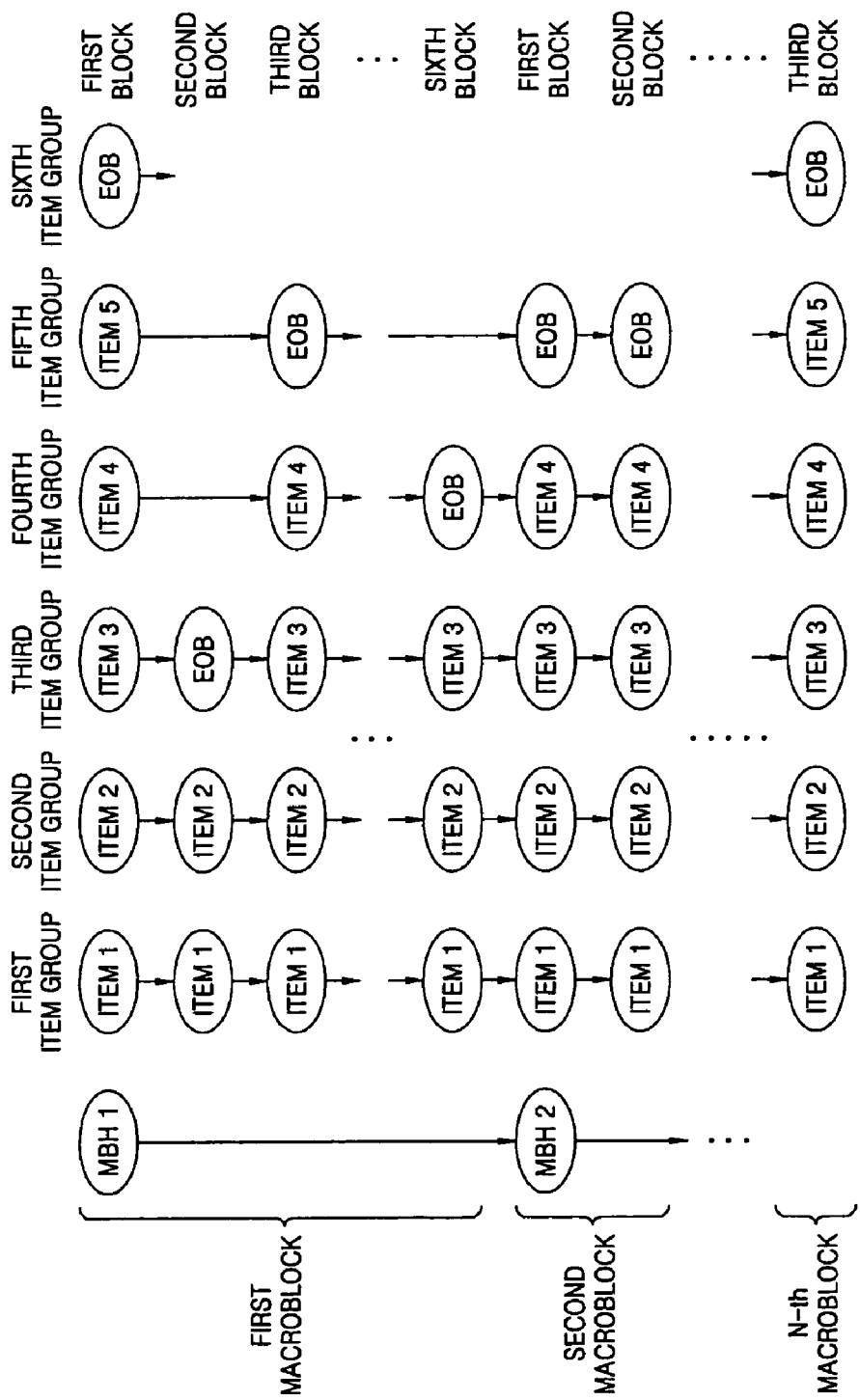
FIG. 6 illustrates a sequence of data encoding, according to an embodiment of the present invention.

FIG. 6 illustrates a sequence of data encoding, according to an embodiment of the present invention. Referring to FIG. 6, the items included in a video packet are encoded. The video packet includes first through N-th macroblocks, each of which includes a macroblock header MBH and six blocks. Each of the blocks is made up of items, at the end of which an EOB is disposed. First items included in each of the blocks of the video packet make up a first item group, and second items included in each of the blocks make up a second item group. In this way, items having an identical identifying item numbers for the items of the blocks make up an item group, e.g., the first item group may include all item 1's, as illustrated in FIG. 6.

This video packet structure is the same as that of FIG. 1. In the conventional encoding method of FIG. 1, the first block of the first macroblock is first encoded, and the second block is then encoded. When the first macroblock is completely encoded, the second macroblock starts being encoded. However, in the embodiment of FIG. 6, encoding is performed on each item group.

More specifically, all of the macroblock headers within the video packet are first encoded, and the first item group of the first items of all of the blocks of the video packet are then encoded. After all of the first items are encoded, the second item group of the second items of all of the blocks of the video packet start being encoded. In this way, items are encoded item group by item group.

Figures 7A, 7B:
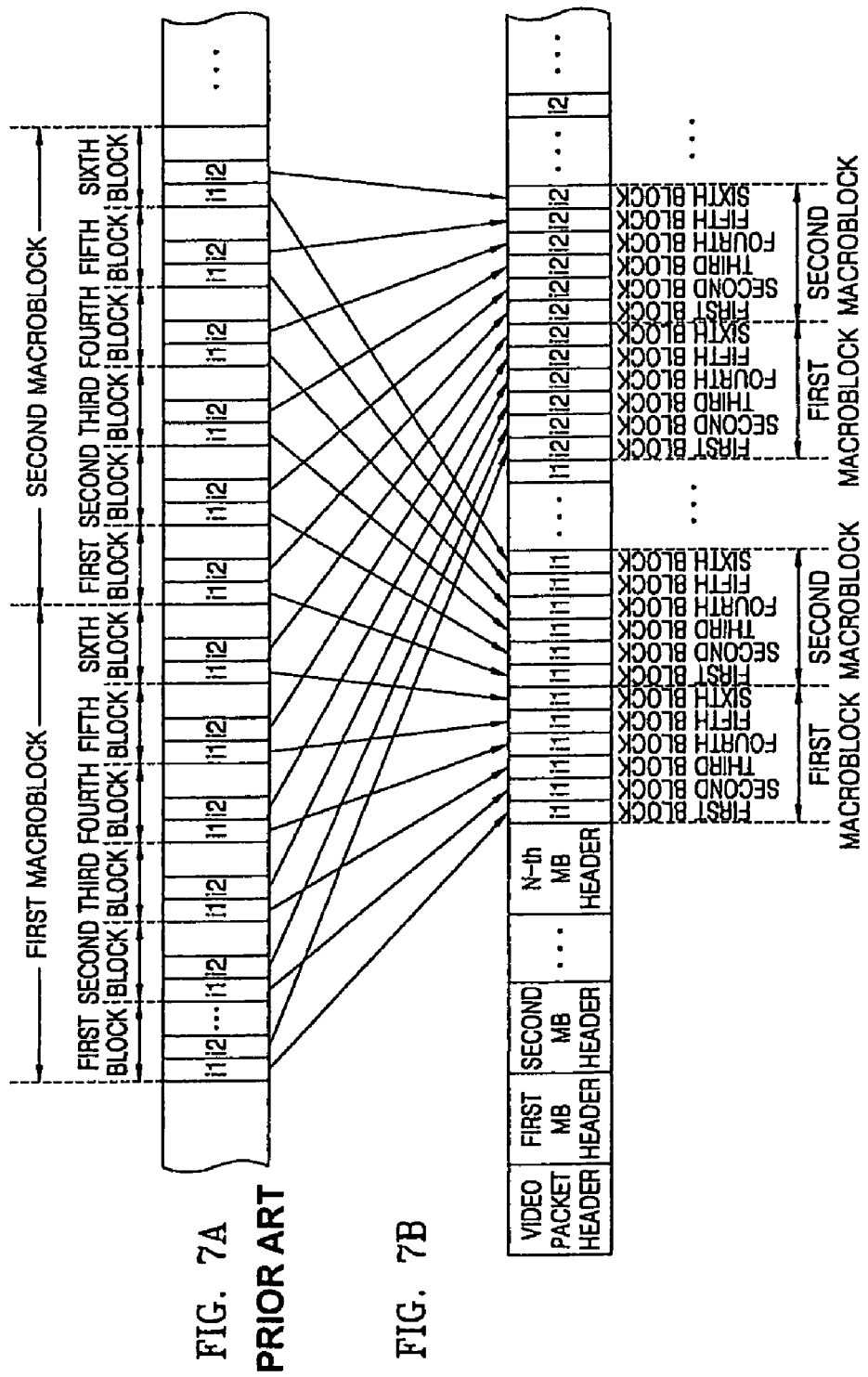
FIG. 7A illustrates a conventional video packet structure.
FIG. 7B illustrates a video packet encoded according to an embodiment of the present invention.

FIG. 7A illustrates a video packet encoded in a conventional encoding method, and FIG. 7B illustrates a video packet encoded in an encoding method according to an embodiment of the present invention.

Referring to FIG. 7A, a video packet is encoded in such a way that macroblocks are sequentially encoded, more specifically, the blocks included in each of the macroblocks are sequentially encoded, and further more specifically, the items included in each of the blocks are sequentially encoded. In other words, all of the items included in a first block, included in a first macroblock, are first encoded, and then all of the items included in a second block are encoded. In this way, up to all of the items included in a sixth block are encoded. Thereafter, the items included in a second macroblock are encoded in the above-described sequence.

Referring to FIG. 7B, a video packet encoded according to an embodiment of the present invention includes a video packet header, macroblock headers, and macroblock encoding data (i.e., items).

The video packet header is disposed at the head of the video packet and followed by the macroblock headers for the macroblocks included in the video data. The macroblock encoding data follows the macroblock headers. First items i1 of all of the blocks included in the video data are arranged right behind the macroblock headers and followed by second items i2 of all of the blocks. The encoding method according to the present embodiment is similar to the conventional encoding method in terms of a block encoding sequence. However, in the encoding method according to the present embodiment, items are classified into item groups, and the item groups are stored. When a video packet is done, the item groups are sequentially arranged to form another video packet.

If important data in each block that affects the quality of a picture are usually stored in the items existing in a front part of the block, the important data can be located in the front part of a video packet by arranging the items existing in the front part of the block in a front part of the video packet, as in the encoding method according to the present embodiment. Accordingly, even when a rear part of the video packet is cut off for some reason, a picture of acceptable quality can be restored by decoding the important data arranged in the front part of the video packet.

Figure 3C:
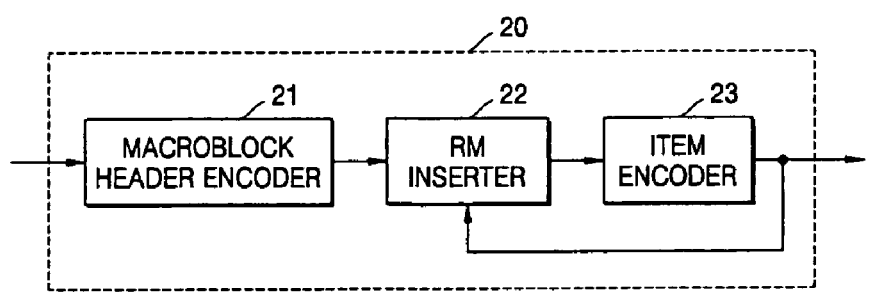
FIG. 3C is a schematic block diagram of a variable length coding unit, according to another embodiment of the present invention.

FIG. 3C is a schematic block diagram of a VLC unit 20, according to another embodiment of the present invention. Referring to FIG. 3C, the VLC unit 20 includes a macroblock header encoder 21, a RM inserter 22, and an item encoder 23.

The macroblock header encoder 21 receives video data corresponding to a single picture frame (which may be a slice within a single picture frame), collects and encodes macroblock headers for all of the macroblocks included in the video data, and arranges the encoded macroblock headers in a front part of a video packet.

The RM inserter 22 inserts an RM having a predetermined pattern into the space between the last macroblock header and each item groups of the video packet.

The item encoder 23 divides the items included in the blocks of the screen into groups of items with identical identifying item numbers, sequentially encodes the item groups, and arranges encoded item groups right behind corresponding RMs, respectively, existing in the video packet.

When the item encoder 23 arranges a first encoded item group right behind a first RM in the video packet, the RM inserter 22 arranges a second RM right behind the first encoded item group. In other words, the RM inserter 22 and the item encoder 23 cooperate to encode items such that an RM is disposed between item groups. Also, when the item encoder 23 detects an item having the same pattern as the RM, it can transform the item and arrange the transformed item in the video packet.

Figure 10:
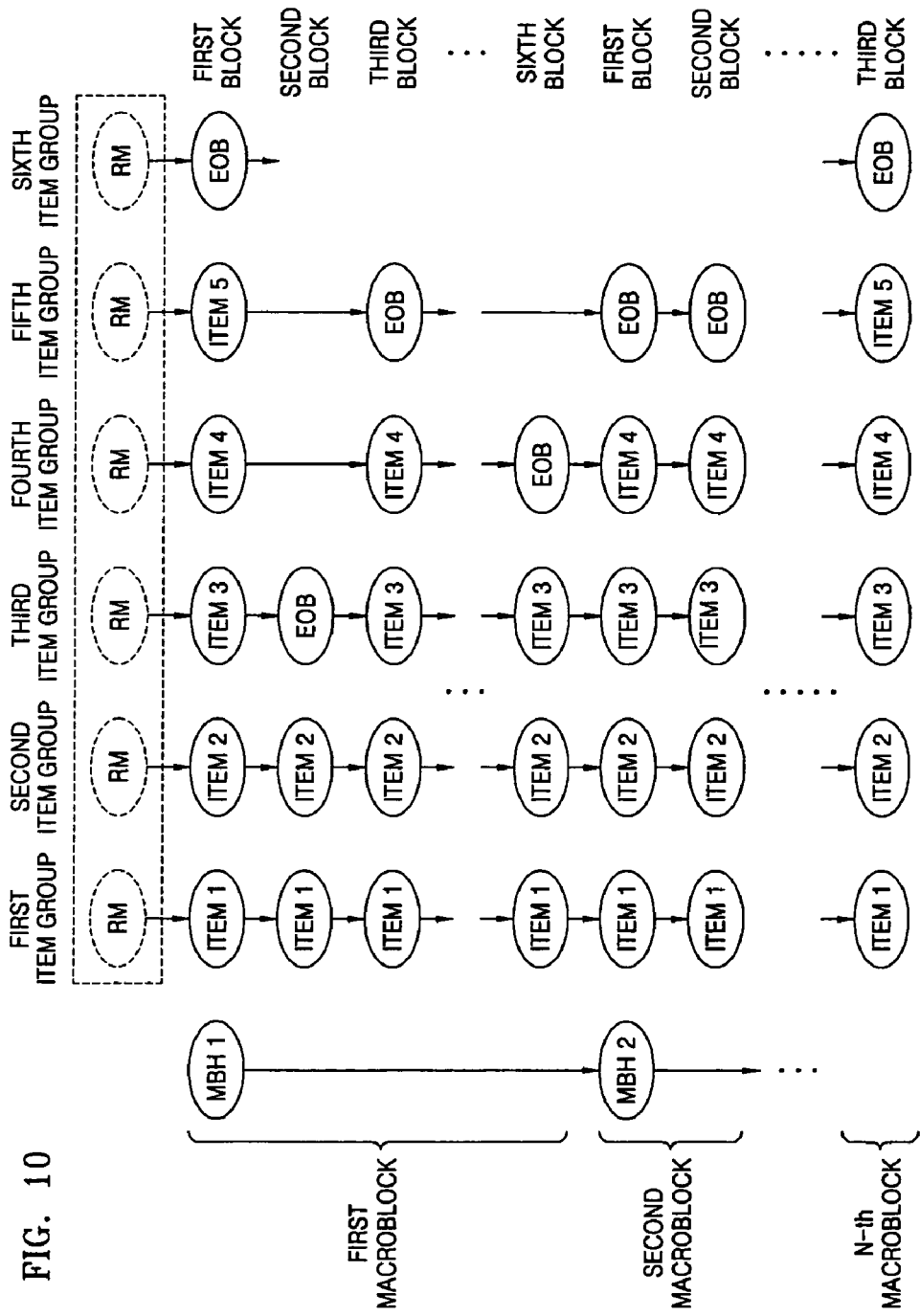
FIG. 10 illustrates a sequence of data encoding, according to another embodiment of the present invention.

A video packet encoding method according to another embodiment of the present invention will now be described in greater detail with reference to FIGS. 10 and 11. FIG. 10 illustrates a sequence of data encoding according to another embodiment of the present invention.

Referring to FIG. 10, the present embodiment is almost the same as the previous embodiment of FIG. 6 except that an RM is disposed in front of each item group. This RM is introduced to reduce the complicity of decoding by a decoder. The use of such an RM facilitates recognition of the start point of each item group.

Figure 11:
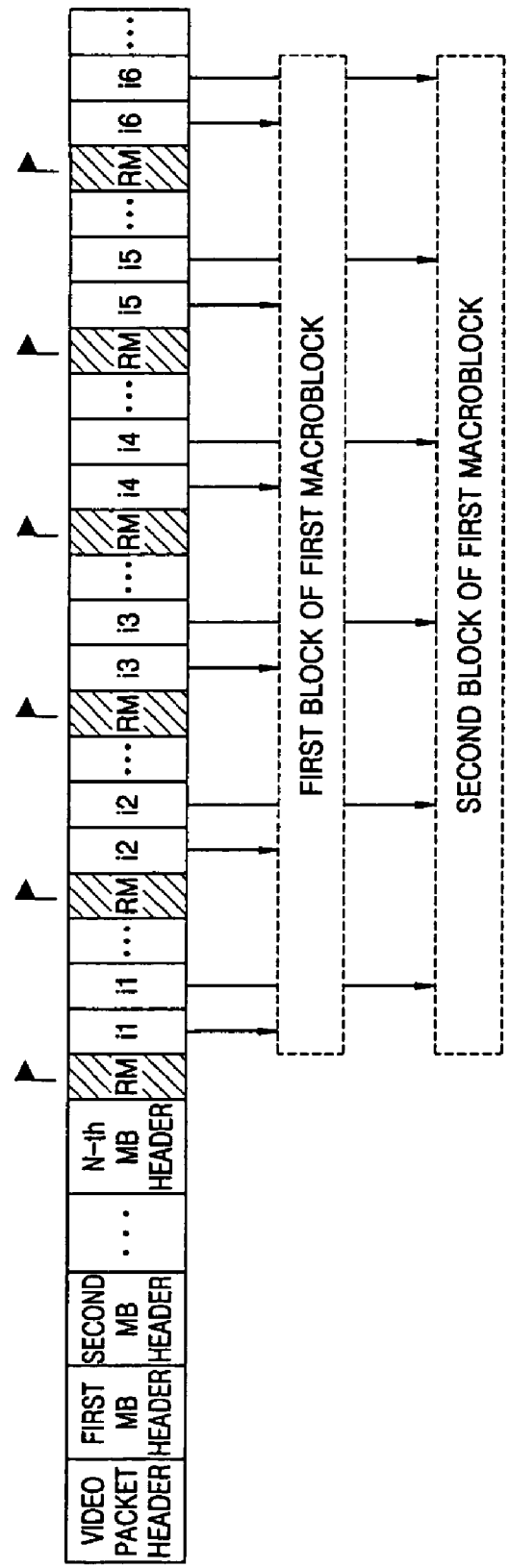
FIG. 11 illustrates a video packet encoded according to another embodiment of the present invention.

FIG. 11 illustrates a video packet encoded according to another embodiment of the present invention. Referring to FIG. 11, the video packet is almost the same as that of FIG. 7B, except that an RM is arranged in front of the start point of each item i. In other words, an RM is disposed before first items i1 are arranged behind an N-th macroblock header. After the first items i1 are completely arranged, and before second items are arranged behind the first items i1, another RM is disposed. In FIG. 11, six RMs are arranged in front of first through sixth items i1, i2, i3, i4, i5, and i6, respectively. Each RM must have a pattern that does not exist in the data included in a video packet. If data having the same pattern as an RM is detected, additional bits can be inserted into the bits of the data using bit stuffing or the like so that confusion of the data with an RM can be prevented.

Using RMs arranged in a video packet, the video packet can be decoded on a block-by-block basis. Referring to FIG. 11, an RM is allocated to each item group so that the location of each item can be easily detected. Accordingly, items located right behind the RMs are items i1, i2, i3, i4, i5, and i6 included in a first block of a first macroblock. In other words, all of the items included in the first block of the first macroblock can be easily extracted using the RMs, and the first block can be decoded using the extracted items. Also, items located directly behind the RMs are items i1, i2, i3, i4, i5, and i6 included in a second block of the first macroblock. Similarly, all of the items included in the second block of the first macroblock can be easily extracted using the RMs, and the second block can be decoded using the extracted items.

Figure 4A:
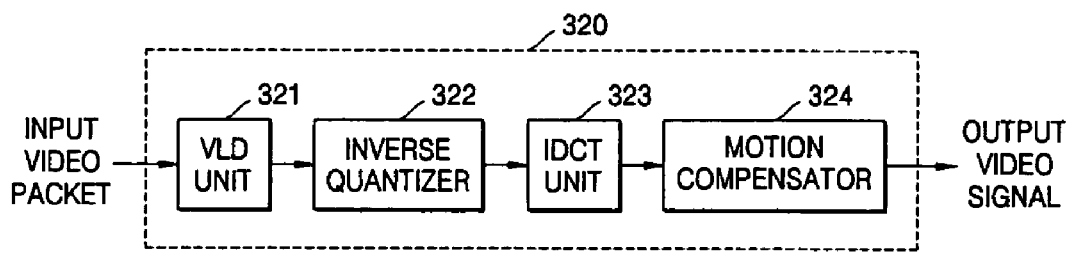
FIG. 4A is a schematic block diagram of a video decoder, according to an embodiment of the present invention.

FIG. 4A is a schematic block diagram of the video decoder 320, which includes a VLD unit 321, an inverse quantizer 322, an IDCT unit 323, and a motion compensator 324.

The VLD unit 321 performs a process reverse to the VLC process and produces quantized data. Output data of the VLD unit 321 includes information such as motion information, the size of a quantization operation, the type of a macroblock, or the like.

The inverse quantizer 322 inversely quantizes the quantized data received from the VLD unit 321 and produces DCT coefficients.

The IDCT unit 323 receives the DCT coefficients from the inverse quantizer 322, executes IDCT on the DCT coefficients, and produces a decoded motion compensation signal.

The motion compensator 324 receives the decoded motion compensation signal and produces video frames to be transmitted to the video display 330.

Figure 4B:
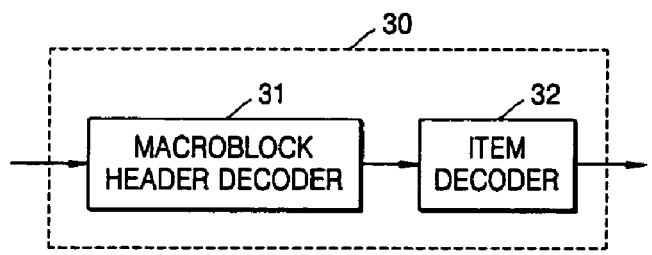
FIG. 4B is a schematic block diagram of a variable length decoding unit, according to an embodiment of the present invention.

FIG. 4B is a schematic block diagram of a VLD unit 30, according to an embodiment of the present invention. Referring to FIG. 4B, the VLD unit 30 includes a macroblock header decoder 31 and an item decoder 32.

The macroblock header decoder 31 receives an encoded video packet as shown in FIG. 7B and decodes all of the macroblock headers, which are located in a front part of the video packet.

The item decoder 32 sequentially decodes the item groups, which are arranged behind the macroblock headers of the video packet. In other words, a first item group made up of first items is first decoded, and a second item group made up of second items is then decoded. This decoding sequence is equally applied to the remaining item groups. This decoding method will be described below with reference to flow charts.

Figure 4C:
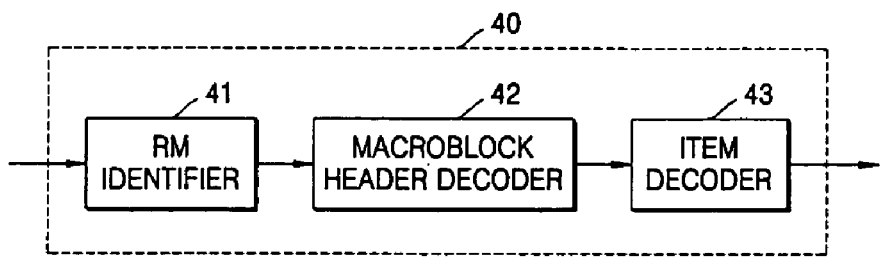
FIG. 4C is a schematic block diagram of a variable length decoding unit, according to another embodiment of the present invention.

FIG. 4C is a schematic block diagram of a VLD unit 40, according to another embodiment of the present invention. Referring to FIG. 4C, the VLD unit 40 includes an RM identifier 41, a macroblock header decoder 42, and an item decoder 43.

The RM identifier 41 identifies all of the RMs included in a video packet and stores information about locations where the RMs are arranged within the video packet.

The macroblock header decoder 42 receives an encoded video packet as shown in FIG. 11 and decodes all of the macroblock headers included in the video packet before decoding the items of each macroblock.

The item decoder 43 extracts the items included in each block included in each of the macroblocks with reference to the RMs identified by the RM identifier 42 and executes VLD on the extracted items. In other words, the item decoder 43 can decode items on a block-by-block basis with reference to RMs. Hence, when one block is completely decoded, it immediately undergoes inverse quantization, IDCT, and motion compensation without needing to be stored. This decoding method will also be described below with reference to flow charts.

Figure 8:
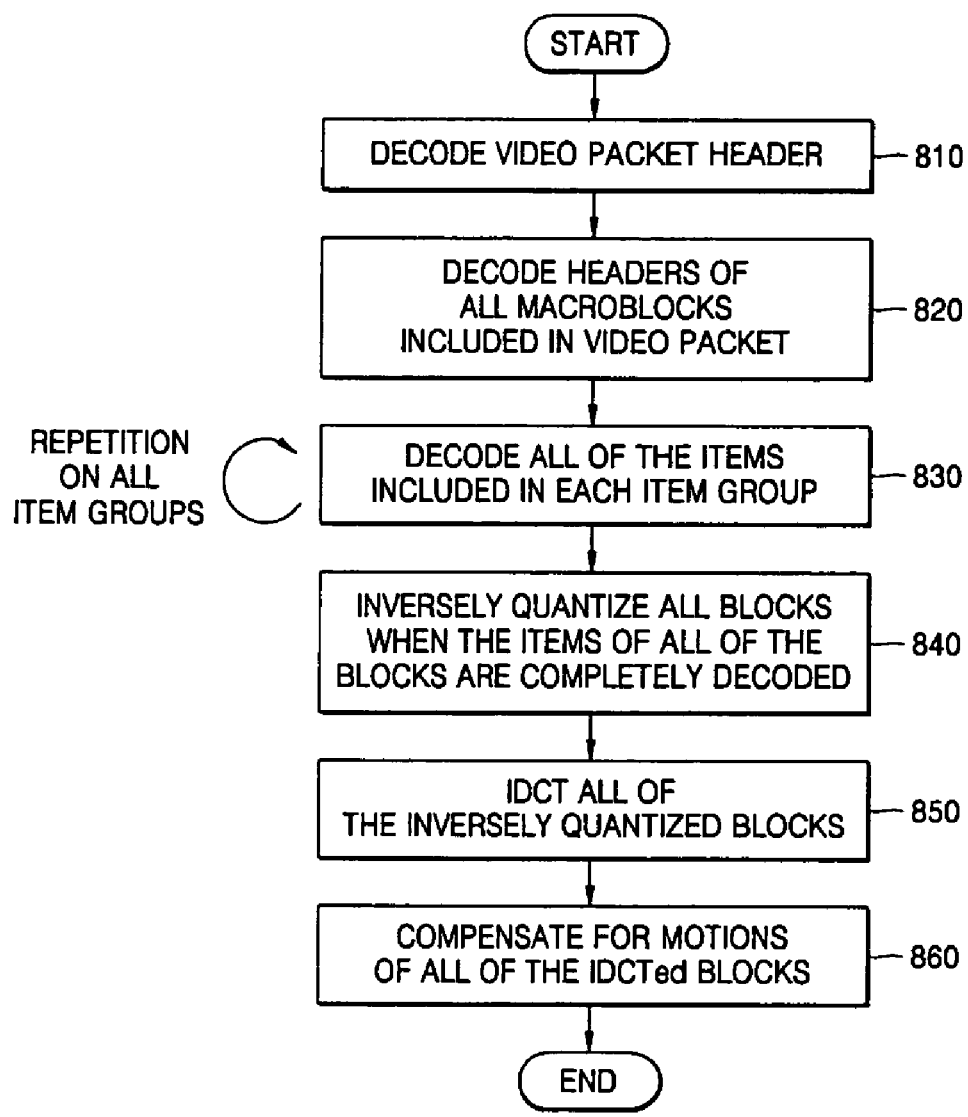
FIG. 8 is a schematic flow chart illustrating a method of decoding a video packet, encoded according to an embodiment of the present invention.

FIG. 8 is a schematic flow chart illustrating a method of decoding a video packet encoded, according to an embodiment of the present invention. Referring to FIG. 8, when the video packet is received, a video packet header located at the head of the video packet is first decoded, in operation 810. Then, in operation 820, macroblock headers located behind the video packet header are decoded. As described later, in a decoding method according to the present embodiment, all of the blocks included in the video packet can be decoded in parallel, as all macroblock headers are located in front of macroblock encoding information in the video packet encoded in the encoding method according to the embodiment of FIG. 6, for example. Hence, in operation 820, all of the macroblock headers included within the video packet are decoded.

Thereafter, in operation 830, since data within the video packet are encoded item group by item group, all of the items included in each item group are decoded. More specifically, a first item group made up of first items of all of the blocks included in the video packet is first decoded, and a second item group made up of second items of all of the blocks included in the video packet is then decoded. This decoding manner is equally applied to the remaining item groups, whereby all items are decoded.

In operation 840, when the items of all of the blocks are completely VLDed, all of the blocks are then inversely quantized.

In operation 850, all of the inversely quantized blocks are IDCTed.

In operation 860, a motion compensation is performed on all of the IDCTed blocks.

Figure 9:
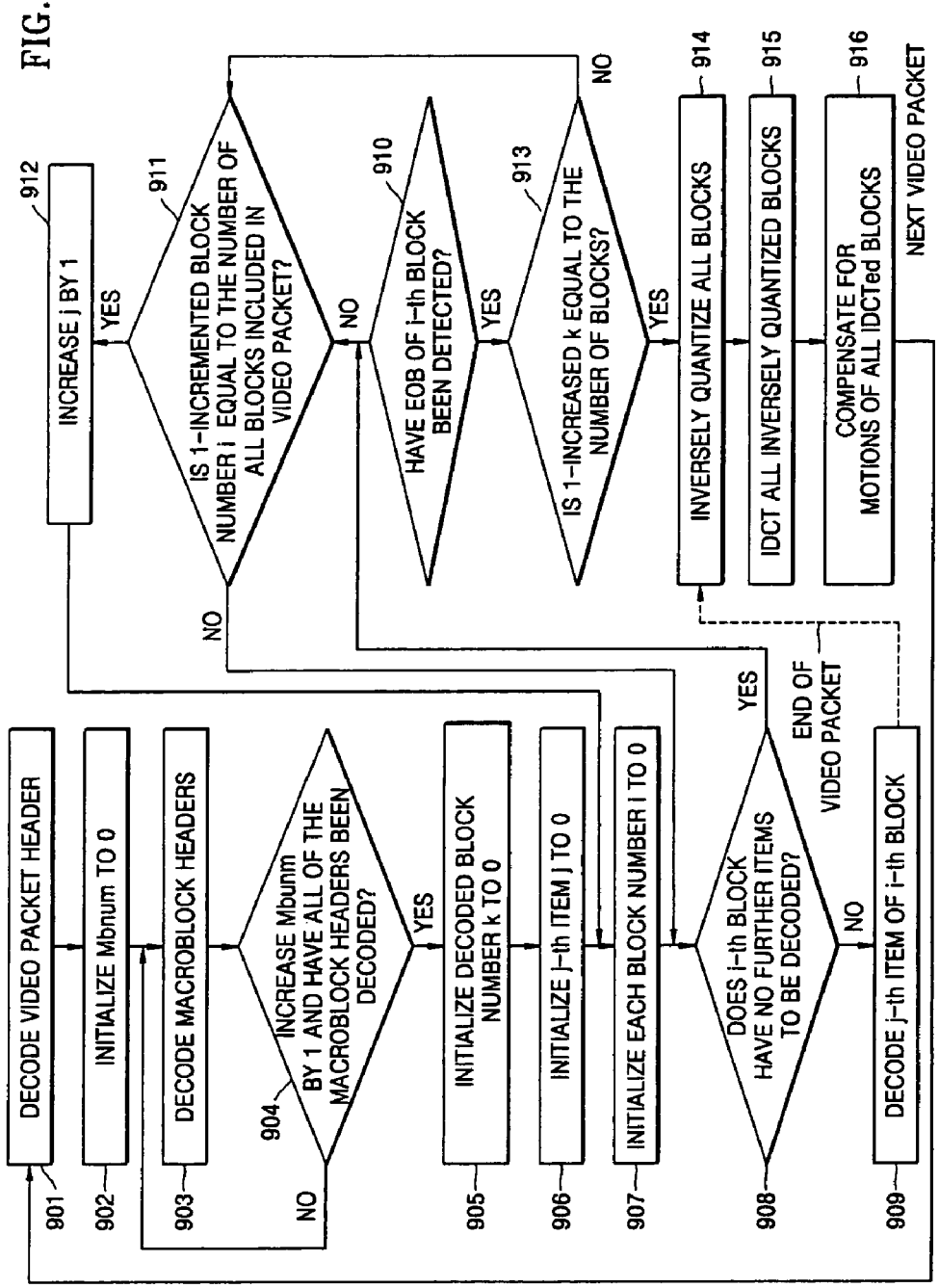
FIG. 9 is a detailed flow chart illustrating the method of FIG. 8.

The video packet decoding method of FIG. 8 will now be described in greater detail with reference to FIG. 9. Referring to FIG. 9, first, the video packet header is decoded in operation 901.

In operation 902, the number of the macroblocks included in the video packet, Mbnum, is initialized to 0.

In operation 903, the macroblock headers are decoded. In operation 904, Mbnum is increased by 1, and the 1-incremented Mbnum is compared with the number of macroblocks included in the video packet to determine whether all of the macroblock headers have been decoded. If it is determined that all of the macroblock headers have been decoded, operation 905 is performed. Otherwise, the method goes back to operation 903, and the next macroblock header is decoded. Operations 902 through 904 make up a process of decoding all of the macroblock headers.

In operation 905, the number of a decoded block, k, is initialized to 0.

In operation 906, a j-th item j is initialized to 0. For example, first items in the structure of FIG. 6 can be represented as j=0, and second items can be represented as j=1.

In operation 907, the number of blocks included in the video packet, i, is initialized to 0. For example, the video packet of FIG. 6 includes N macroblocks, each of which includes 6 blocks. In this case, the number of blocks included in the video packet, i, is 6·N.

In operation 908, it is determined whether an i-th block has no further items to be decoded. For example, in the video packet of FIG. 6, if item 4 of the second block is at turn to be decoded, the method proceeds to operation 911, because the second block does not have an item 4. On the other hand, if item 1 of the second block is at turn to be decoded, the method proceeds to operation 909, because the second block has an item 1.

In operation 909, if it is determined in operation 908 that the i-th block has an item to be decoded, a j-th item of the i-th block is decoded. For example, if item 1 of the second block is at turn to be decoded, item 1 is decoded.

Thereafter, in operation 910, it is determined whether the EOB of the i-th block has been detected. For example, if item 3 of the first block has been decoded in operation 909, it is determined in operation 910 that the EOB of the first block has not been detected. Hence, the method proceeds to operation 911.

In operation 911, the block number i is incremented by 1, and it is determined whether the 1-incremented block number i is equal to the number of all blocks included in the video packet. If i is not equal to the number of blocks, this means that j-th items corresponding to blocks to be decoded remain. Hence, the method returns back to operation 908, and a j-th item of a block next to the i-th block is decoded.

On the other hand, if i is equal to the number of blocks, this means that j-th items of all of the blocks have been completely decoded. Hence, the method proceeds to operation 912, in which j is increased by 1 so that a (j+1)th item starts being decoded.

After operation 912, operation 907 is performed, in which the block number i is initialized to 0.

If it is determined in operation 910 that the EOB of the i-th block has been detected, k is increased by 1, and a determination of whether 1-increased k is equal to the number of blocks is made, in operation 913. If item 3 of the second block has been decoded in operation 909, it is determined in operation 910 that the EOB of the i-th block has been detected, because the item 3 of the second block is the EOB. In other words, detection of an EOB means that the block corresponding to the detected EOB has been completely decoded. Hence, k is increased by 1 to increase the number of decoded blocks. Also, if k is equal to the number of blocks, this means that all of the blocks have been completely decoded. Accordingly, the method proceeds to operation 914, in which all blocks are inversely quantized. On the other hand, if k is not equal to the number of blocks, this means that undecoded blocks remain. Accordingly, the method returns back to operation 911.

If item 4 of the second lock is at turn to be decoded, it is determined in operation 908 that the second block has no further items to be decoded, because the second block does not have an item 4. Hence, the method proceeds to operation 911. In other words, because a current block has no further items to be decoded, the block number i is increased by 1 so that a current item of a next block can be decoded.

If it is determined in operation 913 that all of the blocks have been completely decoded, all decoded blocks are inversely quantized in operation 914, all inversely quantized blocks are IDCTed in operation 915, and motions of all IDCTed blocks are compensated for in operation 916. When motion compensation is performed as described above, a current video packet is completely decoded, and a next video packet undergoes decoding, starting with operation 901.

This decoding method can be applied to when a video decoder receives a complete video packet.

On the other hand, even when a video decoder receives a partial video packet whose rear part has been cut off, the video packet can be effectively decoded, according to the method according to the embodiment of FIG. 8 for example.

While or after a j-th item of the i-th block is decoded in operation 909, the video decoder may detect identification information that represents the end of a video packet. If the header of a next video packet is detected although all of the blocks of a current video packet are not decoded, the video decoder can recognize that the current video packet has ended.

In this case, the method proceeds to operation 914 instead of operation 910. In other words, only decoded blocks undergo inverse quantization, IDCT, and motion compensation. Since items having important data are arranged in a front part of a video packet, a picture of acceptable quality can be reproduced by decoding the items existing in the front part of the video packet, even when the the rear part is not decoded.

Figure 12:
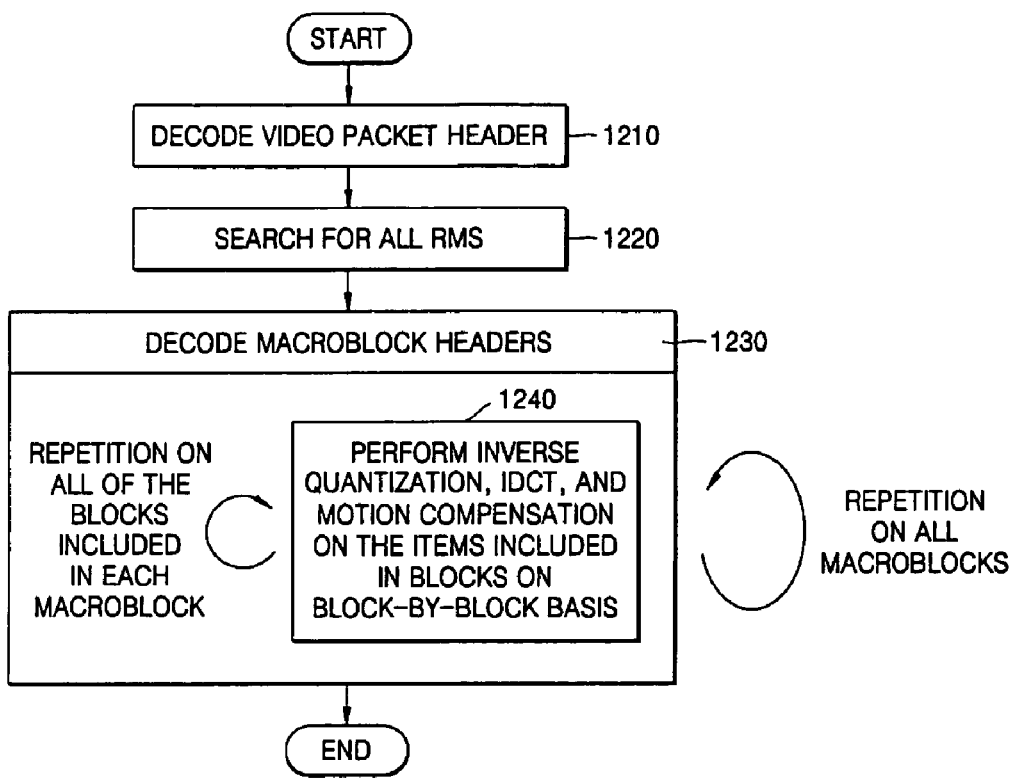
FIG. 12 is a schematic flow chart illustrating a method of decoding a video packet, encoded according to another embodiment of the present invention.

FIG. 12 is a schematic flow chart illustrating a method of decoding a video packet encoded according to another embodiment of the present invention. Referring to FIG. 12, in operation 1210, a video packet header is decoded.

In operation 1220, all RMs are searched for. In other words, the locations of found RMs are stored in a memory.

In operation 1230, macroblock headers are decoded.

In operation 1240, the items of the blocks included in each macroblock are decoded on a block-by-block basis, and decoded blocks undergo inverse quantization, IDCT, and motion compensation. Operation 1240 is performed on a block-by-block basis and repeats until all of the blocks included in each macroblock are processed. As a result, a macroblock is completely decoded.

By repeating operation 1230 on all macroblocks, all the macroblocks are completely decoded.

Figure 13:
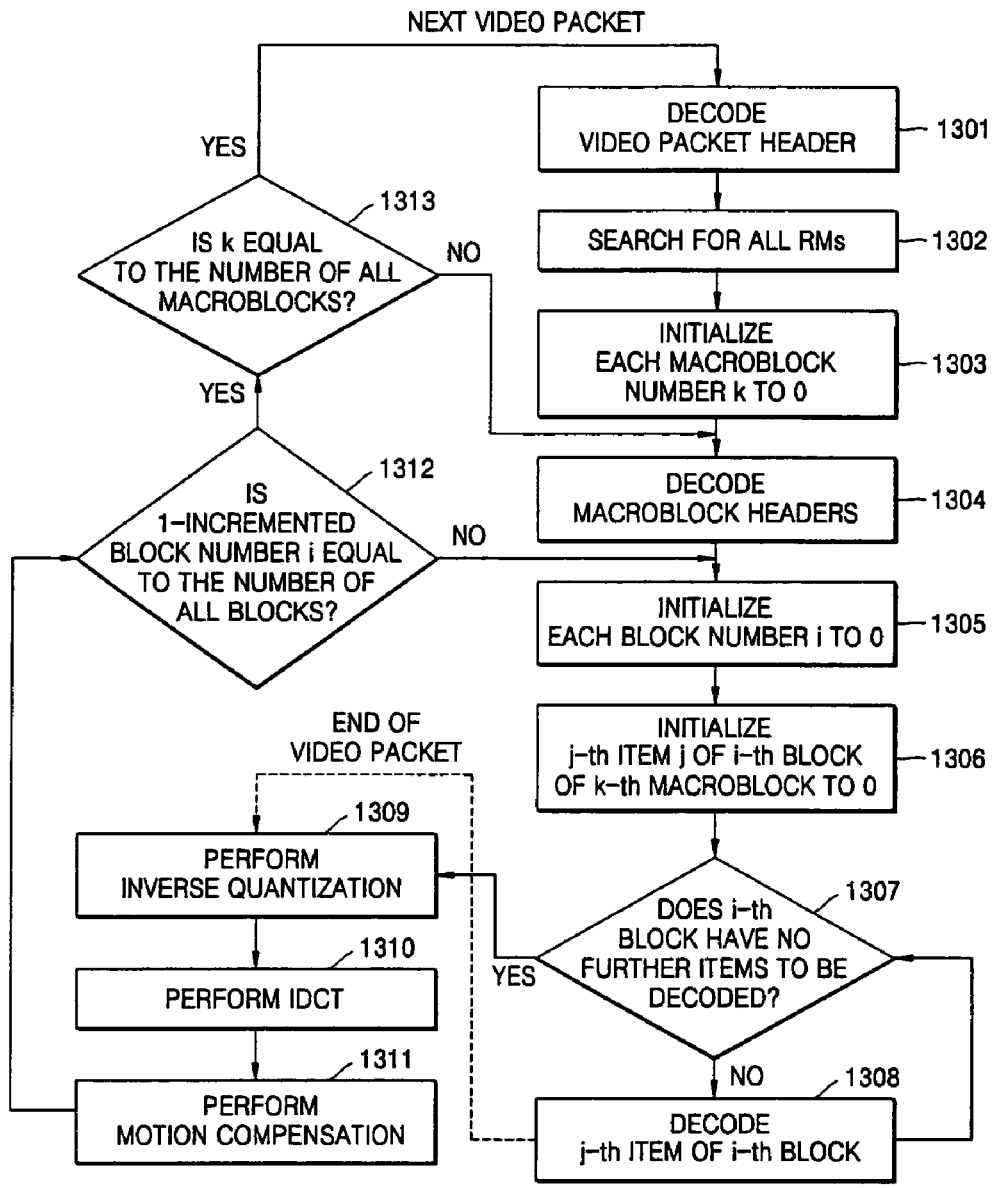
FIG. 13 is a detailed flow chart illustrating the method of FIG. 12.

FIG. 13 is a detailed flow chart illustrating the method of FIG. 12. First, in operation 1301, a header of a video packet is decoded. In operation 1302, all RMs are searched for.

In operation 1303, the number of the macroblocks included in the video packet, k, is initialized to 0.

In operation 1304, the macroblock headers are decoded. In operation 1305, the number of each of the blocks included in the video packet, i, is initialized to 0.

In operation 1306, a j-th item, j, of an i-th block of a k-th macroblock is initialized to 0.

In operation 1307, it is determined whether the i-th block has no further items to be decoded. If it is determined in operation 1307 that the i-th block has an item to be decoded, a j-th item of the i-th block is decoded, and j is increased by 1, in operation 1308. Then, the method feeds back to operation 1307.

If the i-th block has no items to be further decoded, the method proceeds to operation 1309. For example, if item 3 of a second block of a first macroblock in the video packet of FIG. 10 has been decoded, it can be determined in operation 1307 that the second block has no further items to be decoded, because the item 3 of the second block is the EOB. In this case, the method proceeds to operation 1309, in which the second block made up of items 1 and 2 and the EOB is inversely quantized. In operation 1310, the inversely quantized block is IDCTed. In operation 1311, a motion of the IDCTed block is compensated for.

Thereafter, the method proceeds to operation 1312 to decode a block next to the i-th block of the k-th macroblock.

In other words, to decode the block next to the i-th block, the block number i is increased by 1, and a determination of whether the 1-incremented block number i is equal to the number of all blocks is made, in operation 1312. If i is not equal to the number of blocks, this means that blocks remain to be further decoded rin the k-th macroblock. Hence, the method returns to operation 1305 so that the block next to the i-th block is decoded.

On the other hand, if i is equal to the number of blocks, this means that all of the blocks included in the k-th macroblock have been completely decoded. Hence, the method proceeds to operation 1313 to decode a macroblock next to the k-th macroblock. In operation 1313, k is increased by 1, and a determination of whether k is equal to the number of all macroblocks is made.

If k is not equal to the number of all macroblocks, this means that undecoded macroblocks remain in the current video packet. Accordingly, the method proceeds to operation 1304 so that the next macroblock can be decoded.

If k is equal to the number of all macroblocks, this means that all of the macroblocks included in the current video packet have been decoded. Hence, the method proceeds to operation 1301 to start decoding the next video packet.

This decoding method can applied to when a video decoder receives a complete video packet.

On the other hand, even when a video decoder receives a partial video packet whose rear part is cut off, the video packet can be effectively decoded in the method according to the embodiment of FIG. 12.

In FIG. 13, while or after a j-th item of the i-th block is decoded in operation 1308, the video decoder may recognize the end of the current video packet. If the header of a next video packet is detected when all of the blocks of a current video packet are not decoded, or if the end of the current video packet received via a network is detected, the video decoder can recognize that the current video packet has ended. In this case, the method proceeds to operation 1309 instead of operation 1307. In other words, only decoded blocks undergo inverse quantization, IDCT, and motion compensation.

For example, if only a front part of the video packet of FIG. 10, for example, items from a group of items 1 to a group of items 3, instead of a complete video packet, is received, that is, if items from a group of items 4 to a group of items 6 are cut off, only the items 1, 2, and 3 included in each of the blocks of the received video packet are decoded in the decoding method according to the embodiment of FIG. 12. However, as described above, because items having important data are arranged in a front part of a video packet, a picture of acceptable quality can be reproduced even by decoding only the items existing in the front part of the video packet instead of the entire video packet up to the rear part.

Embodiments of the present invention are applicable to a case where a block or a macroblock has no items. This case may be a case where data at identical locations on current and previous frames are the same. Since information about this case is included in the macroblock headers, no problems occur in the application of the embodiments of the present invention.

Embodiments of the present invention are also applicable to not only a DCT-based block coding method but also to all types of encoding methods in which a plurality of blocks, into which a frame is divided, are sequentially encoded so that an encoded block is made up of at least one distinguishable significant item.

The invention can also be implemented through computer readable code on a medium, e.g., a computer readable recording medium. The medium can be any data device that can store/transfer data which can be thereafter read by a computer system. Examples of the medium include read-only memory (ROM), random-access memory (RAM), CD-ROMs, magnetic tapes, floppy disks, optical data storage devices, for example. The medium can also be a distributed network coupled computer system so that the computer readable code is stored, transferred, and/or executed in a distributed fashion. Also, functional programs, codes, and code segments for accomplishing the present invention can be easily construed by programmers skilled in the art to which the present invention pertains. It is also noted that similar media can store/transmit/support the video packet according to embodiments of the present invention.

Figure 14:
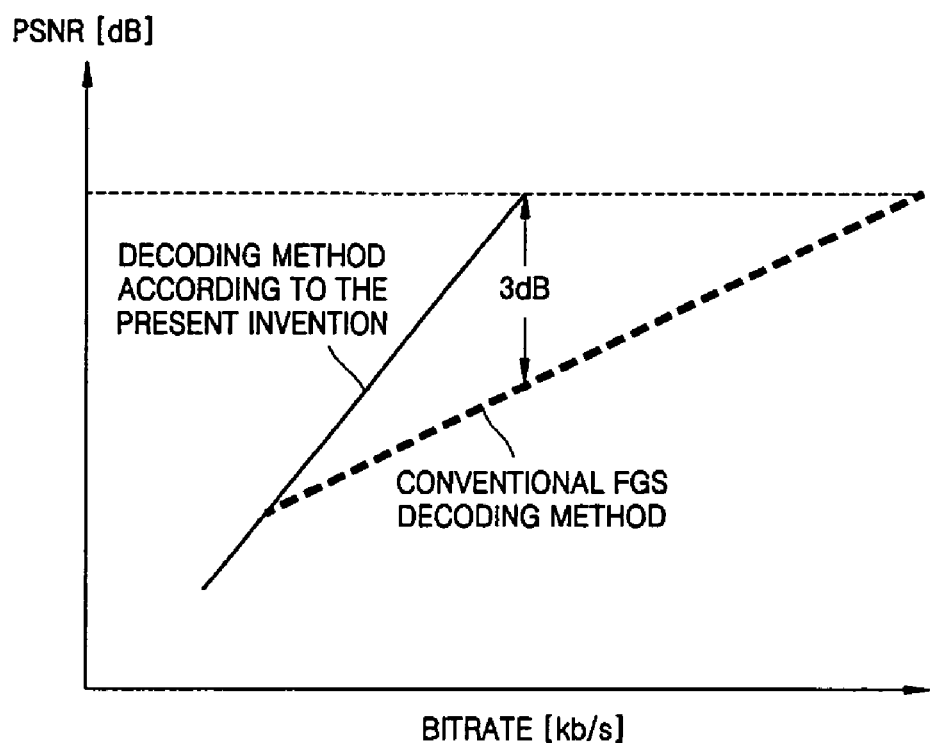
FIG. 14 is a graph of a peak signal-to-noise ratio (PSNR) versus a bitrate in a conventional fine granularity scalability (FGS) decoding method and an FGS decoding method according to the present invention.

Embodiments of the present invention achieve an existing FGS function and also provide an excellent ratio-distortion property, as illustrated in FIG. 14.

FIG. 14 is a graph of a peak signal-to-noise ratio (PSNR) versus a bitrate in a conventional FGS decoding method and an FGS decoding method, according to an embodiment of the present invention. Referring to FIG. 14, the FGS decoding method according to an embodiment of the present invention obtains a gain of about 3 dB higher than the conventional FGS decoding method.

Also, while providing the same ratio-distortion property as that provided by an existing single-layer encoding method, the FGS decoding method according to embodiments of the present invention can achieve the FGS function.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A video encoder, comprising:
an encoding unit dividing items included in blocks of macroblocks of video data into item groups each of which includes items with same significance in a sequence, and encoding video data such that a first item group with more significant items, of the items included in blocks of macroblocks are arranged in a front part of a resultant video packet and a second item group with less significant items are arranged in a rear part of the video packet, and such that the item groups are sequentially arranged, in the front part up to the rear part of the video packet, according to the significance of the items in blocks of macroblocks,
wherein the encoding unit further performs encoding such that each of plural macroblock headers for respective item groups, of the arranged item groups, are arranged in front of all of the arranged item groups within the video packet, and
wherein plural items for each of plural blocks for one macroblock, of the macroblocks, are separately addressable within the video packet based upon a select one of the macroblock headers in the video packet corresponding to the one macroblock for decoding of plural blocks in parallel based upon the one macroblock header.

2. The video encoder of claim 1, wherein the more significant items are items respectively located at front parts of each of the blocks, and the less significant items are items respectively located at rear parts of each of the blocks.

3. The encoder of claim 1, wherein the items are each respective transform coefficients for the blocks.

4. The video encoder of claim 1, wherein each macroblock is made up of plural blocks, with respective first items from each block of a first macroblock being contiguously arranged within the video packet, followed by first items from each block of a second macroblock block being contiguously arranged within the video packet, such that second items, having less significance than the first items, from each block of the first macroblock are contiguously arranged within the video packet after all first items, followed by second items from each block of the second macroblock being contiguously arranged within the video packet, and the first and second items for each block of the first macroblock are separately addressable from the first and second items for each block of the second macroblock based upon respective macroblock headers in the video packet.

5. A video decoder, comprising:
a decoding unit receiving a video packet in which item groups are sequentially arranged, in a front part up to a rear part of the video packet, according to a significance of items included in blocks of macroblocks for video data corresponding to the video packet, such that a first item group with more significant items among the items included in blocks of macroblocks are arranged in the front part of the video packet and a second item group with less significant items are arranged in the rear part of the video packet, and sequentially decoding the items arranged in the video packet
wherein each of the item groups includes items with same significance in a sequence among items included in blocks of macroblocks,
wherein the decoding unit decodes macroblock headers of all of the macroblocks before decoding the items, with each of the macroblock headers for respective item groups, of the arranged item groups, being arranged in the video packet in front of all of the arranged item groups within the video packet, and
wherein the decoding unit decodes plural blocks for one macroblock, of the macroblocks, in parallel based upon plural items for each of the plural blocks being separately addressable within the video packet based upon a select one of the macroblock headers in the video packet corresponding to the one macroblock.

6. The video decoder of claim 5, wherein the more significant items are items located at a front part of each of the blocks, and the less significant items are items located at a rear part of each of the blocks.

7. The video decoder of claim 5, wherein each macroblock is made up of plural blocks, with respective first items from each block of a first macroblock being contiguously arranged within the video packet, followed by first items from each block of a second macroblock block being contiguously arranged within the video packet, such that second items, having less significance than the first items, from each block of the first macroblock are contiguously arranged within the video packet after all first items, followed by second items from each block of the second macroblock being contiguously arranged within the video packet, and the first and second items for each block of the first macroblock are separately addressable from the first and second items for each block of the second macroblock based upon respective macroblock headers in the video packet.

8. A video decoder comprising:
a variable length decoding unit receiving a video packet in which item groups are sequentially arranged, in a front part up to a rear part of the video packet, according to a significance of items included in blocks of macroblocks for video data corresponding to the video packet, such that a first item group with more significant items among the items included in blocks of macroblocks are arranged in the front part of the video packet and a second item group with less significant items are arranged in the rear part of the video packet and which sequentially variable-length-decodes the items arranged in the video packet, wherein each of the item groups includes items with same significance in a sequence among items included in blocks of macroblocks;

an inverse quantizer inversely quantizing all decoded blocks received from the variable length decoding unit;

an inverse discrete cosine transform (IDCT) unit performing IDCT on all inversely quantized blocks; and a motion compensator compensating for motions of all IDCTed blocks, wherein the variable length decoding unit decodes macroblock headers of all of the macroblocks before decoding the items, with each of the macroblock headers for respective item groups, of the arranged item groups, being arranged in the video packet in front of all of the item groups within the video packet, and wherein the variable length decoding unit decodes plural blocks for one macroblock, of the macroblocks, in parallel based upon plural items for each of the plural blocks being separately addressable within the video packet based upon a select one of the macroblock headers in the video packet corresponding to the one macroblock.

9. The video decoder of claim 8, wherein if the variable length decoding unit detects information indicating an end of the video packet before all of the items included in the video packet are completely variable-length-decoded, the variable length decoding unit outputs all blocks variable-length already decoded to the inverse quantizer.

10. The video decoder of claim 8, wherein each macroblock is made up of plural blocks, with respective first items from each block of a first macroblock being contiguously arranged within the video packet, followed by first items from each block of a second macroblock block being contiguously arranged within the video packet, such that second items, having less significance than the first items, from each block of the first macroblock are contiguously arranged within the video packet after all first items, followed by second items from each block of the second macroblock being contiguously arranged within the video packet, and the first and second items for each block of the first macroblock are separately addressable from the first and second items for each block of the second macroblock based upon respective macroblock headers in the video packet.

11. A video encoding method comprising dividing items included in blocks of macroblocks of video data into item groups, each of which includes items with same significance in a sequence, using at lease one processing device, and encoding video data such that a first item group with more significant items, of the items included in blocks of macroblocks of the video data corresponding to a video packet, are arranged in a front part of the video packet and such that less significant items are arranged in a rear part of the video packet, and such that the item groups are sequentially arranged, in the front part up to the rear part of the video packet, according to the significance of the items in blocks of macroblocks, wherein in the encoding, each of plural macroblock headers for respective item groups, of the arranged item groups, are arranged in front of all the arranged item groups within the video packet, and wherein plural items for each of plural blocks for one macroblock, of the macroblocks, are separately addressable within the video packet based upon a select one of the macroblock headers in the video packet corresponding to the one macroblock for decoding of plural blocks in parallel based upon the one macroblock header.

12. The video encoding method of claim 11, wherein the more significant items are items located at a front part of each of the blocks, and the less significant items are items located at a rear part of each of the blocks.

13. The video encoding method of claim 11, wherein each macroblock is made up of plural blocks, with respective first items from each block of a first macroblock being contiguously arranged within the video packet, followed by first items from each block of a second macroblock block being contiguously arranged within the video packet, such that second items, having less significance than the first items, from each block of the first macroblock are contiguously arranged within the video packet after all first items, followed by second items from each block of the second macroblock being contiguously arranged within the video packet, and the first and second items for each block of the first macroblock are separately addressable from the first and second items for each block of the second macroblock based upon respective macroblock headers in the video packet.

14. A video decoding method, comprising:
receiving a video packet in which item groups are sequentially arranged, in a front part up to a rear part of the video packet, according to a significance of items included in blocks of macroblocks for video data corresponding to the video packet, such that a first item group with more significant items of items among the items included in blocks of macroblocks, are arranged in the front part of the video packet, wherein each of the item groups includes items with same significance in a sequence among items included in blocks of macroblocks; and sequentially decoding, using at least one processing device, the items arranged in the video packet, wherein in the decoding, macroblock headers of all of the macroblocks are decoded before decoding the items, with each of the macroblock headers for respective item groups, of the arranged item groups, being arranged in the video packet in front of all of the arranged item groups within the video packet, and wherein in the decoding, plural blocks for one macroblock, of the macroblocks, are decoded in parallel based upon plural items for each of the plural blocks being separately addressable within the video packet based upon a select one of the macroblock headers in the video packet corresponding to the one macroblock.

15. The video decoding method of claim 14, wherein the more significant items are items located at a front part of each of the blocks, and the less significant items are items located at a rear part of each of the blocks.

16. The video decoding method of claim 14, wherein each macroblock is made up of plural blocks, with respective first items from each block of a first macroblock being contiguously arranged within the video packet, followed by first items from each block of a second macroblock block being contiguously arranged within the video packet, such that second items, having less significance than the first items, from each block of the first macroblock are contiguously arranged within the video packet after all first items, followed by second items from each block of the second macroblock being contiguously arranged within the video packet, and the first and second items for each block of the first macroblock are separately addressable from the first and second items for each block of the second macroblock based upon respective macroblock headers in the video packet.

17. A video decoding method comprising:
receiving a video packet in which item groups are sequentially arranged, in a front part up to a rear part of the video packet, according to a significance of items included in blocks of macroblocks for video data corresponding to the video packet, such that a first item group with more significant items among the items included in blocks of macroblocks, are arranged in the front part of the video packet and less significant items are arranged in a rear part of the video packet and sequentially variable-length-decoding the items arranged in the video packet, wherein each of the item groups includes items with same significance in a sequence among items included in blocks of macroblocks;
inversely quantizing all variable-length-decoded blocks;
performing inverse discrete cosine transform (IDCT) on all inversely quantized blocks; and
compensating for motions of all IDCTed blocks,
wherein in the decoding, macroblock headers of all of the macroblocks are decoded before decoding the items, with each of the macroblock headers for respective item groups, of the arranged item groups, being arranged in the video packet in front of all of the arranged item groups within thee video packet items, and
wherein in the decoding, plural blocks for one macroblock, of the macroblocks, are decoded in parallel based upon plural items for each of the plural blocks being separately addressable within the video packet based upon a select one of the macroblock headers in the video packet corresponding to the one macroblock.

18. The video decoding method of claim 17, wherein in variable length decoding, if information indicating an end of the video packet is detected before all of the items included in the video packet are completely variable-length-decoded, all blocks already variable-length decoded are output to undergo inverse quantization.

19. The video decoding method of claim 17, wherein each macroblock is made up of plural blocks, with respective first items from each block of a first macroblock being contiguously arranged within the video packet, followed by first items from each block of a second macroblock block being contiguously arranged within the video packet, such that second items, having less significance than the first items, from each block of the first macroblock are contiguously arranged within the video packet after all first items, followed by second items from each block of the second macroblock being contiguously arranged within the video packet, and the first and second items for each block of the first macroblock are separately addressable from the first and second items for each block of the second macroblock based upon respective macroblock headers in the video packet.

20. A non-transitory medium comprising computer readable code to control a computational device to implement a video decoding method, the video decoding method comprising:
receiving a video packet in which item groups are sequentially arranged, in a front part up to a rear part of the video packet, according to a significance of items included in blocks of macroblocks for video data corresponding to the video packet, such that a first item group with more significant items among the items included in blocks of macroblocks for video data corresponding to the video packet, are arranged in a front part of the video packet and a second item group less significant items are arranged in a rear part of the video packet wherein each of the item groups includes items with same significance in a sequence among items included in blocks of macroblocks; and
sequentially decoding the items arranged in the video packet,
wherein in the decoding, macroblock headers of all of the macroblocks are decoded before the items, with each of the macroblock headers for respective item groups, of the arranged item groups, being arranged in the video packet in front of all of the arrangegd item groups within the video packet, and
wherein in the decoding, plural blocks for one macroblock, of the macroblocks, are decoded in parallel based upon plural items for each of the plural blocks being separately addressable within the video packet based upon a select one of the macroblock headers in the video packet corresponding to the one macroblock.

21. The medium of claim 20, wherein each macroblock is made up of plural blocks, with respective first items from each block of a first macroblock being contiguously arranged within the video packet, followed by first items from each block of a second macroblock block being contiguously arranged within the video packet, such that second items, having less significance than the first items, from each block of the first macroblock are contiguously arranged within the video packet after all first items, followed by second items from each block of the second macroblock being contiguously arranged within the video packet, and the first and second items for each block of the first macroblock are separately addressable from the first and second items for each block of the second macroblock based upon respective macroblock headers in the video packet.

22. A non-transitory medium comprising a video packet with information controlling a computational device in implementing a decoding of the video packet, with the video packet in which item groups are sequentially arranged, in a front part up to a rear part of the video packet, according to a significance of items included in blocks of macroblocks for video data corresponding to video packet, such that a first item group with more significant items of items included in blocks of macroblocks are arranged in the front part of the video packet and such that a second item group with less significant items are arranged in the rear part of the video packet, wherein each of the item groups includes items with same significance in a sequence among items included in blocks of macroblocks, wherein each of the macroblock headers for respective item groups, of the arranged item groups, are arranged in the video packet in front of all the arranged item groups within the video packet, and all items for each of plural blocks for one macroblock, of the macroblocks, are separately addressable within the video packet based upon a select one of the macroblock headers in the video packet corresponding to the one macroblock for decoding of plural blocks in parallel based upon the one macroblock header.

23. The medium of claim 22, wherein each macroblock is made up of plural blocks, with respective first items from each block of a first macroblock being contiguously arranged within the video packet, followed by first items from each block of a second macroblock block being contiguously arranged within the video packet, such that second items, having less significance than the first items, from each block of the first macroblock are contiguously arranged within the video packet after all first items, followed by second items from each block of the second macroblock being contiguously arranged within the video packet, and the first and second items for each block of the first macroblock are separately addressable from the first and second items for each block of the second macroblock based upon respective macroblock headers in the video packet.

* * * * *

UNITED STATES PATENT AND TRADEMARK OFFICE
CERTIFICATE OF CORRECTION

PATENT NO. : 8,014,451 B2
APPLICATION NO. : 11/073898
DATED : September 6, 2011
INVENTOR(S) : Doug-young Suh It is certified that error appears in the above-identified patent and that said Letters Patent is hereby corrected as shown below:

Column 18, Line 2, In Claim 4, after "macroblock" delete "block".

Column 18, Line 35-36, In Claim 5, delete "upon-plural" and insert -- upon plural --, therefor.

Column 18, Line 48, In Claim 7, after "macroblock" delete "block".

Column 19, Line 36, In Claim 10, after "macroblock" delete "block".

Column 19, Line 50, In Claim 11, delete "lease" and insert -- least --, therefor.

Column 20, Line 11 (Approx.), In Claim 13, after "macroblock" delete "block".

Column 20, Line 57, In Claim 16, after "macroblock" delete "block".

Column 21, Line 23, In Claim 17, delete "thee" and insert -- three --, therefor.

Column 21, Line 39, In Claim 19, after "macroblock" delete "block".

Column 22, Line 7, In Claim 20, delete "arrangegd" and insert -- arranged --, therefor.

Column 22, Line 18, In Claim 21, after "macroblock" delete "block".

Column 22, Line 54, In Claim 23, after "marcoblock" delete "block".

Signed and Sealed this
Seventh Day of February, 2012

David J. Kappos
*Director of the United States Patent and Trademark Office*